Oct. 30, 1951  C. J. GORMAN  2,573,260
TEMPORARY COVER FOR OUTLET BOXES
Filed June 3, 1949
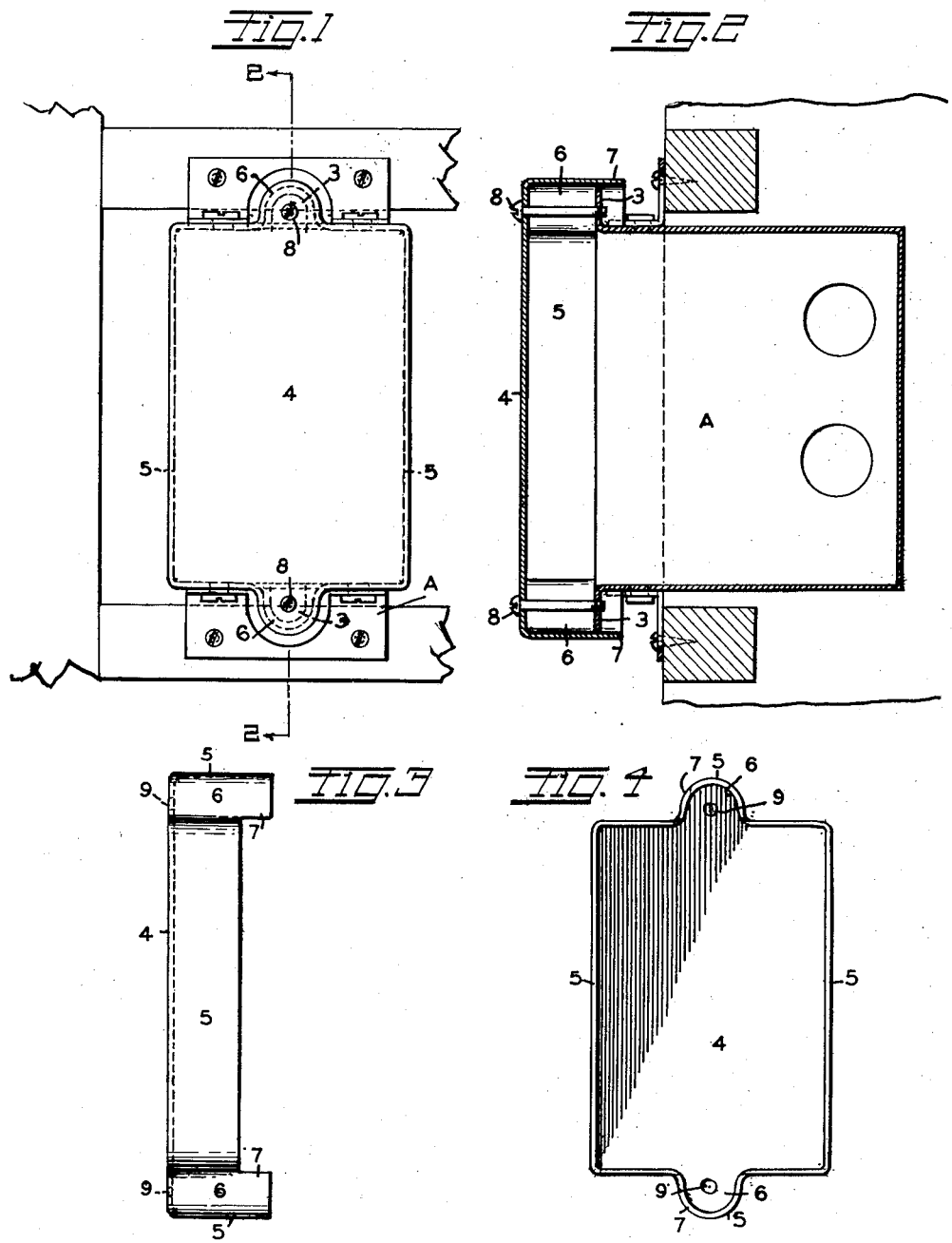
INVENTOR.
CHARLES J. GORMAN
BY
Edward M Fisher
ATTY.

Patented Oct. 30, 1951

2,573,260

UNITED STATES PATENT OFFICE 2,573,260

TEMPORARY COVER FOR OUTLET BOXES

Charles J. Gorman, Orlando, Fla.

Application June 3, 1949, Serial No. 96,899

2 Claims. (Cl. 220—3.4)

This invention relates to a cover for a switch receptacle or box having out-turned fastener receiving ears at its front.

In the structure of buildings which are internally plastered, outlet boxes, switch receptacles and the like are positioned in the walls before plastering, the means of said positioning being dependent on type of wall structure. However, fixtures are not placed until after plastering has been done, so that the receptacles are left open allowing plaster to accumulate therein, during wall plastering.

Primary object of this invention is provision of an inexpensive cover for temporarily closing an outlet receptacle or box, and the like, against accumulation of plaster therein, and to fasten said cover to the receptacle or box whereby, although said cover may be splashed or covered with plaster during plastering of the walls, said fastening means may be readily located.

A further object of the invention is to provide an improved temporary cover for an electrical receptacle or outlet box of a conventional type which has opposed, out-turned threaded, fastener receiving ears adjacent its front edge. Outlet boxes having out-turned ears threaded to receive the screws by which the finish cover plates are secured to the box have found wide favor and are very largely used. They are usually so positioned with respect to the building studs or other elements forming a wall that is to receive lath and plaster, that the ears lie spaced materially in front of the studs. Consequently, when the plaster is applied some of it enters and hardens in the threaded openings of the ears. The cover of this invention is not only designed to cover the outlet box itself but to cover said ears and prevent the plaster from hardening in and over the ears or from entering the threaded openings of the ears, despite the exposed outstanding position of the latter.

Further the invention contemplates the provision of screws for securing the temporary cover to the ears, which screws also serve to plug the threaded openings of the ears against the entry of plaster until the time comes to remove the temporary cover.

A further object of the structure here presented is to provide a simple, inexpensive cover of the kind herein described, which may be formed from plastic, and used on numerous occasions.

This invention is illustrated in the accompanying drawings, wherein:

Figure 1 illustrates an embodiment of this invention as related to a switch receptacle or box, with one form of engagement of said receptacle in a wall.

Figure 2 is a section on the line 2—2 Figure 1.

Figure 3 is an edge elevation of the invention.

Figure 4 is a rear face view thereof.

The true nature and manner of use of a device in accordance with this invention will be best understood by a detailed description of the form thereof, shown in the drawings in an illustrative sense.

Now referring more particularly to the drawings A designates an open faced switch receptacle or box of the type having opposed out-turned fastener receiving ears 2 with threaded apertures 3 for screw fastening of the cover or other fixtures thereto.

In Figures 1 and 2 there is illustrated one means of engaging said receptacle or box in a building wall, but this is not to be considered as a limitation, as there are many forms of wall structure each calling for an engagement to fit the occasion.

To enclose said open face, cover the ears 2 and close apertures 3, I provide a cover having a flange 5 throughout conforming to the size and shape of receptacle or box A, including bowed plate-like face section 4, with an unbroken edge housings 6 which embrace offset pocketing areas at opposite ends of the plate to receive the ears, the offset pocketing areas to the flange being extended beyond the cover body portion thereof as at 7, to protect the ears from side plaster splashing or plugging.

Threaded apertures 3 are closed to plaster plugging by means of screws 8 which fasten the cover to the receptacle, same being directed through apertures 9 in extensions of plate 4 which extensions close the front ends of housing 6. The screws engage apertures 3. At times plaster will be splashed over the screws and cover making it hard to locate same, therefore, I use magnetized screws which can be easily located by a tool such as a screw driver or other tools carried by an electrician.

What is claimed:

1. A temporary, plaster excluding cover for an electric outlet box of the conventional rectangular type having out-turned ears at opposed points about its periphery and adjacent the front edge of the box, said ears having threaded openings therethrough, said cover comprising a face section, an inturned peripheral flange carried by the face section dimensioned to conform to and engage the front edge of the outlet box substantially entirely therearound and outwardly projecting housings integral with the cover and extending laterally thereof and positioned to overlie and enclose the out-turned ears of the box, said housing being of a length to extend to a point rearwardly of said ears, to aid in excluding plaster from the area in the rear of said ears, and means for holding the cover upon the outlet box.

2. A temporary, plaster excluding cover for an electric outlet box of the conventional rectangular type having out-turned ears at opposed points about its periphery and adjacent the front edge of the box, said ears having threaded openings therethrough, said cover comprising a face section, an inturned peripheral flange carried by the face section dimensioned to conform to and engage the front edge of the outlet box substantially entirely therearound and outwardly projecting housings integral with the cover and extending laterally thereof and positioned to overlie and enclose the out-turned ears of the box, said housings being of a length to extend to a point rearwardly of said ears, to aid in excluding plaster from the area in the rear of said ears, said housings comprising walls which close their front ends and are pierced for the passage of screws, said openings being aligned with the threaded openings of the ears, whereby when screws are passed through said openings and engaged with said ears, said screws serve to draw the cover firmly to plaster excluding engagement with the box, hold it there and by their presence plug the openings of the ears against the entry of plaster.

CHARLES J. GORMAN.

REFERENCES CITED

The following references are of record in the file of this patent:

UNITED STATES PATENTS

| Number | Name | Date |
|---|---|---|
| 1,550,870 | Braden | Aug. 25, 1925 |
| 1,724,307 | Peterson | Aug. 13, 1929 |
| 1,935,565 | Goetzelman | Nov. 14, 1933 |
| 2,204,006 | Allen et al. | June 11, 1940 |
| 2,288,377 | Tuttle | June 30, 1942 |